United States Patent
Burbo et al.

[11] 4,202,601
[45] May 13, 1980

[54] TRAINING AID FOR USE WITH NIGHT VISION APPARATUS

[75] Inventors: James H. Burbo; Louis P. Hartman, both of Roanoke, Va.

[73] Assignee: International Telephone and Telegraph Corporation, New York, N.Y.

[21] Appl. No.: 900,100

[22] Filed: Apr. 26, 1978

[51] Int. Cl.² .................. G02C 7/12; G02B 5/30
[52] U.S. Cl. ................................ 350/159; 351/49
[58] Field of Search ........... 350/159, 148, 1.1, 1.2, 350/36; 351/49

[56] References Cited
U.S. PATENT DOCUMENTS

| | | | |
|---|---|---|---|
| 2,199,715 | 5/1940 | Sauer | 350/148 |
| 4,037,921 | 7/1977 | Cox | 350/36 |

*Primary Examiner*—John K. Corbin
*Assistant Examiner*—Rodney Bovernick
*Attorney, Agent, or Firm*—John T. O'Halloran; Peter C. Van Der Sluys

[57] ABSTRACT

A filter arrangement is described which is incorporated with a night vision device. The filter arrangement consists of a variable density polaroid filter array and a blue-green filter all contained in a common housing and directed along a given optical path. The filter arrangement serves to control the amount of light directed to an input port of a night vision device such as a pair of goggles. In this manner, a user can be trained to employ the night vision device under direct supervision in daylight conditions and by variation of the polarizing plates is enabled to simulate nighttime conditions.

14 Claims, 4 Drawing Figures

TRAINING AID FOR USE WITH NIGHT VISION APPARATUS

BACKGROUND OF THE INVENTION

This invention relates to a training device for use with a night vision device and more particularly, a filter arrangement which can be used to simulate night time conditions during daylight.

As is well known, the term night vision devices include direct view systems employing image intensification. Such systems have various uses but in general, enable night time vision by responding to low level radiation which is present at night to enable a user to visually perceive a scene or object in the nightime or in extremely dark environments.

Essentially, night vision devices employ an image intensifier or similar tube. The function of the image intensifier is to multiply the amount of incident light received by it to produce a greater signal for application either to a camera or directly to the eyes of a viewer. As such, these devices have both industrial and military application. Examples of early uses of such devices can be had by reference to a text entitled "Photo Electricity and its Applications" published in 1949 by John Wiley & Sons. Chapter 18 entitled "Light Beam Signaling and Infrared Detection" shows examples of early night vision devices such as the "Sniperscope" and "Snooperscope." Such devices are employed by the Military to enable troops to perceive the enemy at night. In any event, the chapter further discusses various peace time uses.

The development of such devices has followed the strides made in the electronic technologies. The apparatus' as presently employed for night vision are extremely small and compact. Hence, various companies such as the Assignee herein produce a number of devices such as night vision goggles for enabling one to accomplish night viewing. The Assignee herein supplies night vision goggles as No. F-4907 manufactured by IT&T Electro-Optical Products Division of Roanoke, Va. These devices will enable one to perceive at night with great acuity and perception.

It is however, important for the user to practice with the devices under supervision during the daylight before attempting to use the device in nighttime operation. This is especially true in military applications or in other specified activities, such as flying aircraft, driving or weapons operations. In this manner, the person employing the goggles is trained by a qualified assistant who monitors the operation while the goggle user learns to perceive according to the particular characteristics of the night vision device. Hence, it is extremely desirable to provide an apparatus which can simulate night conditions over a wide range of illumination levels.

It is therefore an object of this invention to provide an aid to be used in conjunction with a night vision device which is capable of reducing the ambient light reaching the night vision device to a level equivalent to nighttime conditions such as starlight, overcast moonlight, or direct moonlight. This enables a user to be trained in operating the night vision device under supervision occurring during the daytime.

BRIEF DESCRIPTION OF PREFERRED EMBODIMENT

Apparatus for controlling the amount of ambient light reaching an input port of a night vision device of the type employing image intensification to enable a user to employ said night vision device in daylight conditions to aid in training the user in the operation of said device under conditions prevalent in nighttime operations, comprising a housing having an internal hollow located between a light input port and a light output port and means for coupling said housing to said input port of said night vision device, a variable density filter located in said hollow of said housing and capable when varied of reducing the ambient light reaching said output port according to said variation.

DETAILED DESCRIPTION OF THE INVENTION

Figure 1:
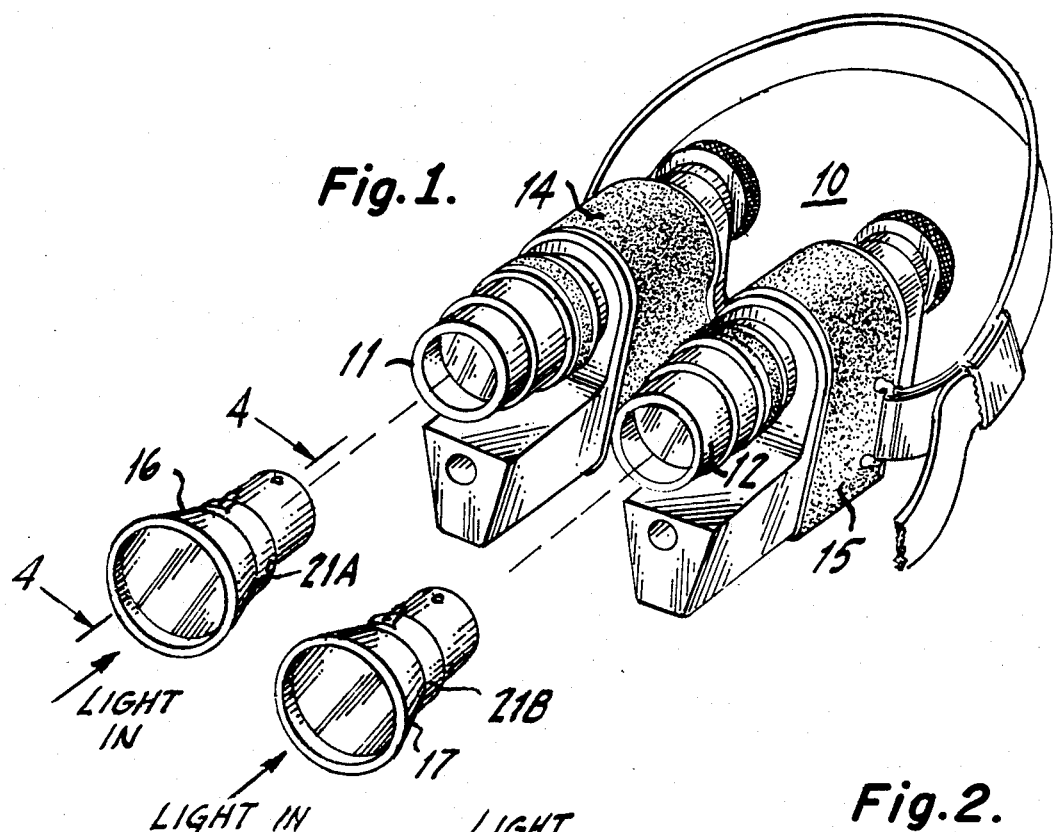
FIG. 1 is a perspective plan view of a night vision device and two filter housings each containing a filter arrangement according to this invention.

Referring to FIG. 1, there is shown one embodiment of a night vision device as the type capable of being employed in conjunction with the apparatus of this invention. Basically, the device 10 may be referred to as night vision goggles and are employed by a user to be positioned over his eyes.

The goggles 10 contain light input sections 11 and 12; each of which is associated with a housing 14 and 15. Based on the increased strides made in integrated circuit technology, the housings 14 and 15 contain the complete electronic assembly necessary to enable one to perceive and view scenes or objects under the conditions of reduced ambient light.

Generally, a device such as 10 may contain a microchannel plate which consists of a thin glass plate with an array of microscopic holes through it. Each hole is capable of acting as a channel-type secondary emission electron multiplier. The plate when positioned in the plane of the electron image in an intensifier tube, makes it possible to acheive extremely high gains. The tube employed can be considered to be an array of photomultipliers and as such, is the vacuum tube equivalent of semiconductor large scale integration.

The techniques employed in the present generation of night vision devices are briefly described above and are known in the art. The structural and functional configuration of such night vision devices is well known and various other techniques can be employed to produce apparatus as 10 of FIG. 1 employing infrared image converter tubes or other image intensifying devices and schemes. Thus, it is considered that it is well known in the state of the art to achieve night vision by techniques as described above and other techniques as known and employed in the prior art.

A user, in order to optimumly and effectively employ a night vision device such as 10, must be trained and supervised in the procedure and operation of the device. It is apparent and known that while the night vision device 10 permits the user to see in night operations, his field of view and the images provided are not indicative of the same image which would be viewed by him under ordinary daylight and hence, practice with the device is required.

Shown in proximity to the input ports 11 and 12 of the night vision device 10 are two housings 16 and 17. Each housing as will be described, contains a filter arrangement which enables the simulation of nighttime conditions during a daylight operation. The housings 16 and 17 are adapted to be positioned over the input ports 11 and 12 of the night vision goggle arrangement 10.

It is, of course, apparent that a multitude of techniques for positioning and securing a housing as 16 and 17 to another assembly as 11 and 12 are well known in the art and many alternatives can be employed.

Figure 2:
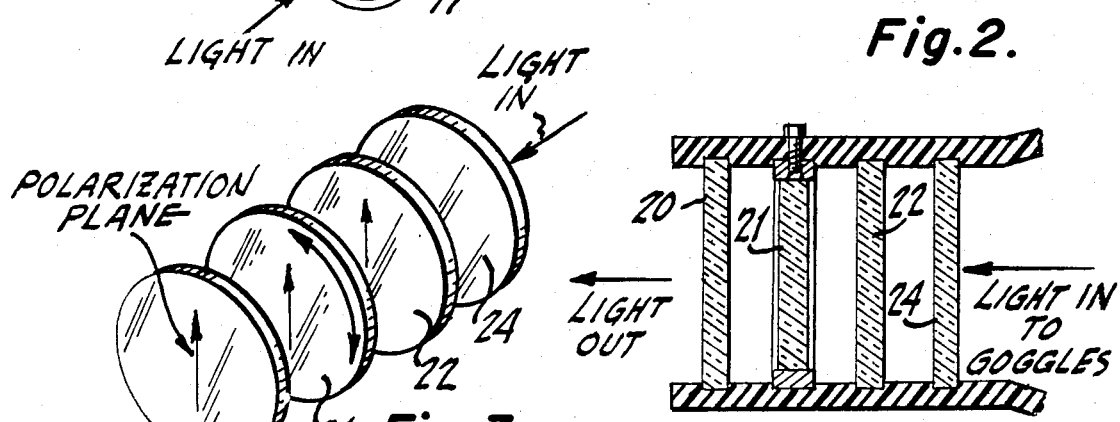
FIG. 2 is a side plan view of a filter arrangement which is accommodated by a housing shown in FIG. 1.

Referring to FIG. 2, there is shown a filter arrangement which can be employed and included in each housing as 16 and 17 to provide night time simulation during a daytime operation.

The filter shown includes a first polarizing plate 20, a second polarizing plate 21 and a third polarizing plate 22. A fourth plate 24 is shown and is positioned in the optical path as well. The plate 24 is a glass plate which operates as a blue-green filter. The filter compensates for deficiencies in the infrared transmission characteristics of the polaroid plates 20,21 and 22 to avoid a contrast reversal effect. Essentially, contrast reversal is the effect of the high reflectivity in the near infrared of most green foilage which causes the foilage to appear white when viewed through the goggles.

Figure 3:
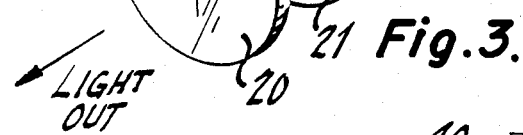
FIG. 3 is a perspective view of the filter arrangement shown in FIG. 2.

The operation of the apparatus is as follows:

The filter arrangement shown in FIG. 2 and FIG. 3 in perspective view, is contained within the housing 16. The polaroid plates 20 and 22 are accurately positioned with the direction of polarization being parallel. The center plate 21 may be rotated with respect to plates 20 and 22 and the rotation of this plate serves to vary the light intensity. Hence, by rotation of the plate 21, one can then control the amount of ambient light reaching the input ports 11 and 12 associated with the goggles. The filter 24 is a blue-green filter as for example, sold by Schott Glass Company as Glass Type BG18.

As seen in FIGS. 2 and 3, the light which impinges upon the filter arrangement is ordinary daylight. The day-light passes through the polarizer plates in succession and the fraction of light finally emerging depends upon the angle between the transmission planes of the polarizers. As is well known, magnitude of such light can be made to vary from nearly one hundred percent to zero. It is known that the same effect may be produced by two reflections at glass plates turned to reflect in different planes but at the same polarizing angles. The operation of such polarizers and the techniques of controlling ambient light by employing such polarizers is well known.

In this manner, the housing 16 which contains the filter array shown in FIGS. 2 and 3 has an adjustable or rotatable outer ring 21A and 21B for housings 16 and 17. This adjustable ring is coupled to the polarizer plate 21 associated with each housing and hence, permits the operator or user to rotate the plate and hence, the polarizer element 21 with respect to the elements 20 and 22.

It is important, as above indicated, to note that the purpose of the blue-green filter 24 is to compensate for the deficiencies inherent in the infrared transmission characteristics of the polaroid materials employed in plates 20,21 and 22.

As indicated above, present polarizers as commercially available, do not transmit the infrared components of light in a linear manner as compared to other frequency components contained in the light beam. Hence, the blue-green filter serves to attenuate transmitted light components about the near infra-red spectrum which are for example, emitted by foilage such as grass, trees and so on. In this manner, the output light from the entire arrangement depicted is indicative of nighttime conditions. By rotating the plate 21 with respect to plates 20 and 22, one can thereby achieve a variation in the light directed to the night vision device and hence, by such rotation one can simulate various nighttime conditions as starlight, overcast moonlight, or direct moonlight and one can do so in any particular daylight condition as from early dusk to noon day sunlight.

The polarizer elements employed for plates 20-22 are fabricated from polaroid HN-22 material and are available from IT&T as above indicated as well as other manufacturers.

The effective length of the housings 16 and 17 shown is approximately 1.85" or 47 millimeters with the greater diameter of the housing being 1.67 inches or 41.5 millimeters in diameter. Each housing and associated filter weighs approximately 60 grams. The extinction ratio of each device upon rotation of the polaroid plate 22 is $4 \times 10^6$ minimum. The extinction ratio is the ratio of maximum or minimum transmission. The maximum transmission desirable to simulate nighttime conditions is approximately two percent and the above noted extinction ratio can be accommodated within this range of maximum transmission.

Hence, by employing the above noted invention in conjunction with a night vision device such as the goggles 10, one can reduce the amount of ambient daylight reaching the goggles to simulate a true nighttime condition. In this manner, the above described aid when employed with a night vision device enables the training of unskilled users in optimumly employing night vision devices for the various purposes intended and under strict supervision in daylight conditions.

Figure 4:
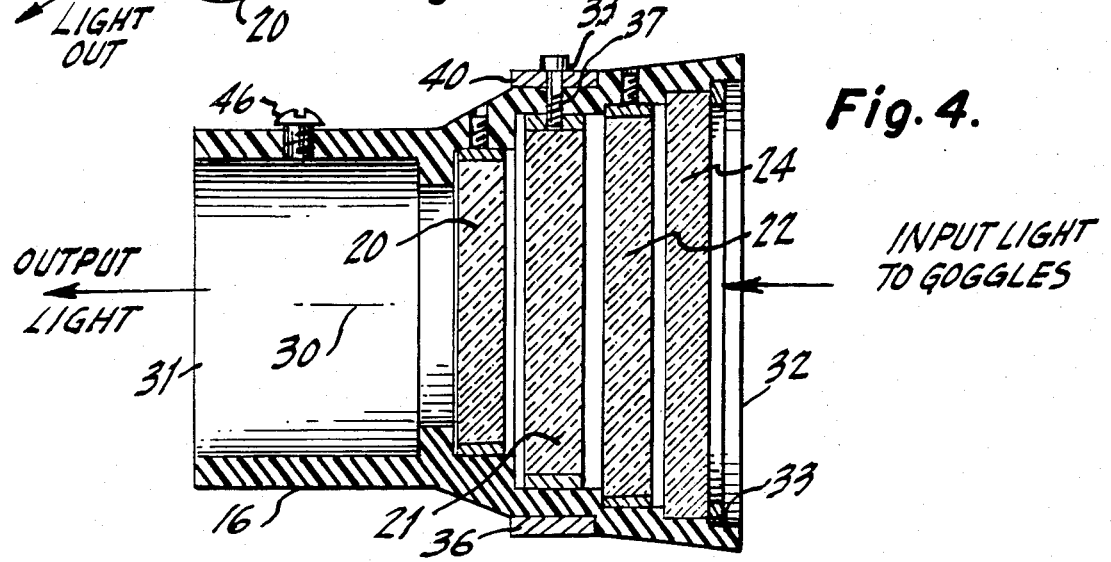
FIG. 4 is a cross-sectional view of a housing accommodating a filter assembly according to FIG. 2.

FIG. 4 is a cross-sectional view of a housing as 16 and 17 showing the filter configuration mounted in the housing.

Referring to FIG. 4, the housing is basically of the configuration shown in FIG. 1. The first polaroid plate 20 is contained in a suitable frame and held in position with respect to the central axis 30 of the filter housing as 16 or 17 as shown in FIG. 1. The housing has a first light input port 32 for receiving light and a light output port 31. Adjacent the input port 32 is a locking ring or other locking device structure 33. The locking device structure 33 serves to retain the glass filter 24 and the lens assembly firmly secured within the housing. The output port 31 is coupled to the goggles via sections 11 and 12 by means of a suitable set screw or fastener employed in aperture 46.

Positioned within the housing in a suitable frame is the rotatable filter 21. The filter 21 is contained in a suitable frame as 34. Coupled to the frame is a fastener 33 which is secured to an adjusting ring 36. The fastener rides in a slot 37 and hence, the filter and the frame 34 can be rotated with respect to the filter 20 as described above. Many examples of turret configurations or adjusting rings are well known in the camera and optical art and are not considered part of this invention.

The polaroid plate 22 is positioned within the suitable recess of the housing 16 and is parallel to the plate 20. Next located within the housing is the glass filter plate 24 which, as indicated, has a blue-green transmission characteristic and is located closest to the input port 32 of the housing 16. In this manner, the housing is secured to the goggle as described above and incoming light is varied in intensity prior to application of the same to the goggles via the output port 31 associated with the housing 16.

It should be apparent that any type of housing can be employed to accomplish the placement of such a filter in order to reduce the level of ambient light reaching a night vision device such as a pair of goggles. It is thus understood that many modifications in regard to such housings and associated structure to rotate a polaroid plate with respect to other plates should be apparent to those skilled in the art.

Although the above training aid has been described for use with goggles, it is of course, understood that the same device and apparatus can be employed with the use of a telescope night vision device providing night vision to a single eye or a single camera.

What is claimed is:

1. In a night vision device of the type employing image intensification between an input and an output port, with said output port adapted to direct an image to the eye of a user, in combination therewith apparatus for controlling the amount of ambient light reaching said output port to enable a user to employ said night vision device in daylight conditions to aid in training the user in operation of said device under conditions prevalent in nightime operations, comprising:
   a housing having an internal hollow located between a light input port and a light output port, and means for coupling said housing to said input port of said night vision device,
   a variable density filter located in said hollow of said housing and capable when varied of reducing the ambient light reaching said output port according to said variation to thereby enable a user to accurately simulate nightime conditions during typical daylight conditions according to said density filter.

2. The apparatus according to claim 1 wherein said filter includes at least first and second polarizing plates capable of being rotated one with respect to the other to vary the angle of polarization therebetween and hence, the intensity of ambient light passing therethrough, and means positioned on said housing and coupled to one of said plates to enable rotation of said one plate with respect to said other plate.

3. The apparatus according to claim 2 wherein said variable density filter includes at least one filter element having a specified light frequency characteristic to compensate for any light transmission deficiencies inherent in said polaroid plates.

4. The apparatus according to claim 3 wherein said filter element is a blue-green filter operative to compensate for high reflectivity from the near infra-red spectrum of light as undesirably transmitted due to said definiciency in said polarizing plates.

5. The apparatus according to claim 1 wherein said variable density filter comprises a first polarizing plate rigidly positioned in said hollow of said housing near said first port with the plane of polarization in a predetermined orientation, a second polarizing plate positioned in proximity with said first plate and rotatably mounted in said housing to therefore vary the plane of polarization with respect to said first plate and a third plate rigidly positioned adjacent said second plate and near said output port with the plane of polarization of said third plate parallel to that of said first plate, said plates operative as positioned to reduce the intensity of a light beam directed from said input to said output port by selectively rotating said second plate.

6. The apparatus according to claim 5 including filter means located in said housing and positioned between said input and output ports to compensate said beam of light as reduced in intensity by said plates for any contrast reversal effects due to the transmission characteristics of said polarizing plates.

7. The apparatus according to claim 6 wherein said filter means is a blue-green filter.

8. The apparatus according to claim 1 wherein said variable density filter when varied from a maximum to a minimum value provides an extinction ratio of at least $4 \times 10^6$.

9. The apparatus according to claim 1 wherein said night vision device is night vision goggles having a left and a right section with each of said sections having an associated input port adapted to be coupled to said housing.

10. The apparatus according to claim 1 wherein said variable density filter is capable of varying said ambient light to a level equivalent to a nighttime condition indicative of the type of light as emanating from typical celestrial bodies.

11. A method for training a user in the operation of a night vision device under daylight conditions, said night vision device of the type employing image intensification between an input port for receiving light and an output port for transmitting an intensified light image to the eye of a user, comprising the steps of:
    placing a variable density filter in the optical path of said night vision device,
    varying the density of said filter during daylight conditions to alter the amount of ambient light reaching said output port to thereby enable said user to accurately simulate nightime conditions during typical daylight conditions according to the variation of said density.

12. The method according to claim 11 wherein the step of placing a variable density filter in the optical path comprises the steps of:
    first placing a first polarizing plate at a predetermined position in said optical path,
    second, placing a second polarizing plate in a second position in said optical path, and varying the density of said filter by the step of rotating one of said plates with respect to said other to vary the angle of polarization therebetween and hence the intensity of ambient light reaching said output port.

13. The method according to claim 12 further including the step of:
    positioning a blue-green filter in said optical path to compensate for high reflectivity from the green-blue spectrum of light.

14. The method according to claim 11 wherein said variable density filter is varied between a maximum to a minimum value providing an extinction ratio of at least $4 \times 10^6$.

* * * * *